(12) United States Patent
Tamatsu et al.

(10) Patent No.: US 6,888,494 B2
(45) Date of Patent: May 3, 2005

(54) FMCW RADAR SYSTEM

(75) Inventors: Yukimasa Tamatsu, Okazaki (JP); Hiroaki Kumon, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/367,842

(22) Filed: Feb. 19, 2003

(65) Prior Publication Data
US 2003/0156055 A1 Aug. 21, 2003

(30) Foreign Application Priority Data
Feb. 19, 2002 (JP) ........................................ 2002-041633

(51) Int. Cl.$^7$ .............................................. G01S 13/93
(52) U.S. Cl. ........................... 342/128; 342/70; 342/109
(58) Field of Search ........................ 342/70, 128, 109, 342/133; 180/167, 168, 169

(56) References Cited

U.S. PATENT DOCUMENTS 5,751,240 A * 5/1998 Fujita et al. .................. 342/70
5,757,307 A * 5/1998 Nakatani et al. ............... 342/70
6,067,038 A    5/2000 Uehara et al.
6,384,769 B1 * 5/2002 Mitsumoto et al. ......... 342/109
2003/0142009 A1 * 7/2003 Mitsumoto et al. ......... 342/109

FOREIGN PATENT DOCUMENTS

JP            4-295787        10/1992
JP            2000-214250     8/2000

* cited by examiner

Primary Examiner—Ian J. Lobo
(74) Attorney, Agent, or Firm—Posz & Bethards, PLC

(57) ABSTRACT

An inventive frequency modulated continuous wave (FMCW) radar system realizes both a quick detection of a higher relative speed provisional target and a sure detection of a smaller relative speed provisional target. The number of detection cycles used for a paring validity check, used to see if a detected target or a pair of frequencies is an actual target or a pair for an actual target, is set in response to the relative velocity enabling the target information for a target of higher relative velocity to be output more quickly.

18 Claims, 8 Drawing Sheets

FMCW RADAR SYSTEM

BACKGROUND OF THE INVENTION

1. Field of the Invention

The invention relates to a frequency-modulated continuous wave (FMCW) radar system for detecting the distance or range, the azimuth angle and/or the relative or radial velocity of a reflection object or target object in the field being monitored.

2. Description of the Prior Art

FMCW radar systems are well-known and wide spread for use in vehicle collision avoidance and tracking cruise keeping a constant distance to the vehicle ahead. In FMCW radar systems, a transmission signal is so frequency-modulated as to gradually or linearly increase and decrease in frequency. The frequency-modulated transmission signal is transmitted as a radar wave and reflected by a reflection object or target. The reflected or returned radar wave from the target is mixed with the transmission signal to yield a beat signal. The beat signal is analog-to-digital converted and Fourier converted. The peak frequencies of the beat signal are identified as to which each of the peak frequencies belongs to, the increasing section or the decreasing section of each modulation period. On the basis of a peak frequency fpI in the increasing section and a peak frequency fpD in the decreasing section, the distance D and the relative velocity V to the target (referred to en bloc as "target information") are calculated by using the following equations:

$$D = \frac{C}{8\Delta F \cdot fm} \cdot (fpI + fpD) \quad (1)$$

$$V = \frac{C}{4f0} \cdot (fpI - fpD) \quad (2)$$

where $\Delta F$ is the range of variation in the transmission signal, $f0$ is the central frequency of the transmission signal, $1/fm$ is the period of time required for one cycle of modulation, and C is the velocity of light.

In actual operation environment, several target objects often exist in the field being monitored, which causes the same number of peak frequencies as that of the target objects to be detected in each of the increasing and decreasing sections.

It is well known that if the relative velocities of a vehicle ahead and a vehicle mounted with the FMCW radar system are different from each other: i.e., V=0 in equation (2), then the peak frequencies fpI and fpD for the vehicle ahead are shifted due to the Doppler effect. Accordingly, if there are two or more targets in the monitor field, the peak frequencies for the targets do not always appear in order of distances to the targets. In selecting, for each target, a corresponding peak frequency from each of the increasing and decreasing sections of a modulation cycle, simply taking one by one from each section in order of distances to the targets may yield wrong values of the distance, the azimuth angle and the relative velocity.

For this reason, whether the peak frequencies in the increasing section and the peak frequencies in the decreasing section have been properly paired for respective targets is judged in the following manner. i.e., (1) the peak frequencies in the increasing section and the peak frequencies in the decreasing section are pieced together in an appropriate way to form provisional peak pairs associated with the respective targets; (2) on the basis of the behavior or movement of a target associated with each of the provisional peak pairs, a pair of peak frequencies to be detected after the lapse of a certain period are estimated for the target; (3) if any peak pair which substantially matches the estimated pair of peak frequencies (referred to as "estimated peak pair") is found in peak frequencies actually detected after the lapse of the certain period, then it is judged that the provisional peak pair is a true peak pair.

If, as the behavior of a target associated with a provisional peak pair (referred to as "provisional target"), it is found that the target is running 100 m ahead at a speed of 50 Km/h for example, then the target is estimated to be running about 113.9 m ahead at 50 Km/h after the lapse of a certain period, e.g., 1 second. Accordingly, what has to be done is to find a peak pair that shows such a behavior in the peak frequencies detected after the lapse of the certain period (after 1 second).

However, just described peak pair identification method such as judges whether a provisional peak pair is right or not on the basis of the behavior of a provisional target associated with the provisional peak pair causes it to take time to output the target information, and accordingly is not suitable for the recognition of rapidly approaching target or an application that needs quick recognition.

Specifically, as is well known in the art, the distance resolution of FMCW radar system depends on the modulation width of the radar wave. In order to enable a correct estimation of the behavior of a provisional target, the provisional target has to make a move of distance more than the distance resolution. The time required for the move is set as an initial detection period (Dr) of time in FMCW radars. The shorter initial detection period enables the quicker recognition. However, it is necessary to set the initial detection period to a value larger than Dr/Vmin, where Vmin is the lower limit value of the relative velocity which enables the detection of the target. As seen from this, trying to raise the detection precision for lower-relative-velocity targets results in a longer initial detection period. Taking a margin into account in order to enhance the recognition reliability will cause the initial detection period to become further longer.

In view of the above, what is needed is a FMCW radar system provided with both a raised detection accuracy for lower-relative-velocity targets and a quicker response in detection of higher-relative velocity targets.

SUMMARY OF THE INVENTION

According to an aspect of the invention, a frequency modulated continuous wave (FMCW) radar system for detecting the distance and the velocity of a target relative to the radar system every detection cycle is provided. The radar system includes a transmitter including a circuit for generating a transmission signal the frequency of which increases during an increasing section of a duration and decreases during an decreasing section of said duration; a receiver including a circuit for extracting a beat component signal from said transmission signal and a received return signal reflected by said target; and a signal and data processing section. The processing section includes a portion for extracting peak frequencies at which the amplitude of said beat component signal becomes a peak from said beat component signal. The peak frequencies extracted during said increasing section are referred to as "increasing section peak frequencies" and the peak frequencies extracted during said decreasing section are referred to as "decreasing section peak frequencies".

Under the control of a stored program, the processing section operates to find target information which includes a distance and a velocity of each of said definitely detected targets from a pair of increasing and decreasing section peak frequencies selected for said definitely detected target from said extracted peak frequencies (said pair being referred to as "peak pair"); make provisional peak pairs from extracted peak frequencies other than those used for peak pairs associated with said definitely detected targets, assuming that said provisional peak pairs correspond to respective provisional targets; every detection cycle, make a test to see if each of continuation provisional targets which have been detected at least one detection cycle ago has continuity with any of said provisional peak pairs; register a continuation provisional target that have passed said tests made in a preset number of detection cycles to be a new definitely detected target; register a provisional target that has judged to be in lack in continuity with any of said continuation provisional targets as a new continuation provisional target; and set said preset number associated with said new continuation provisional target to a value, said value being such that the higher the relative velocity of said new continuation provisional target, the smaller said value and vice versa.

According to another aspect of the invention, a computer program to be executed in a FMCW radar system for realizing just described operation by the processing section is provided.

BRIEF DESCRIPTION OF THE DRAWING

Further objects and advantages of the present invention will be apparent from the following description of the preferred embodiments of the invention as illustrated in the accompanying drawing, in which.

Throughout the drawing, the same elements when shown in more than one figure are designated by the same reference numerals.

DETAILED DESCRIPTION OF THE PREFERRED EMBODIMENTS

Figure 1:
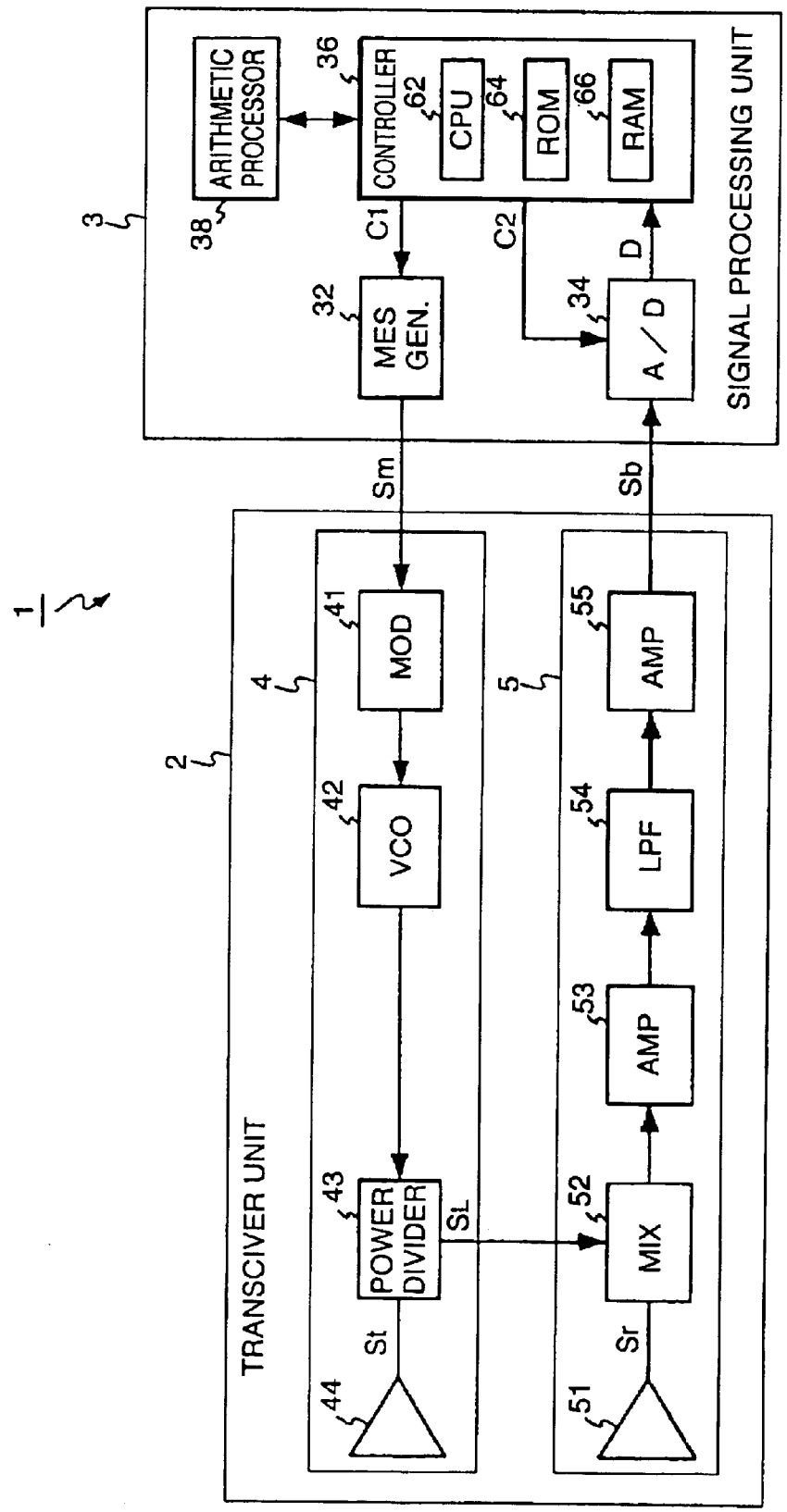
FIG. 1 is a schematic block diagram showing an exemplary arrangement of a frequency modulated continuous wave (FMCW) radar system of the invention.

FIG. 1 is a schematic block diagram showing an exemplary arrangement of a frequency modulated continuous wave (FMCW) radar system in accordance with an illustrative embodiment of the invention. In FIG. 1, the FMCW radar system 1 comprises a transceiver unit 2 and a signal processing unit 3 for generating a modulation signal Sm and executing a target detecting operation on the basis of a signal Sb received from the transceiver unit 2. The transceiver unit 2 comprises a transmitter 4 for transmitting a radar wave which has been modulated with the modulation signal Sm from the signal processing unit 3 and a receiver 5 for receiving an echo caused by the reflection of the radar wave due to a target to provide the signal Sb (detailed later).

In this specific example, it is assumed that the transceiver unit 2 is fixed on the front of a vehicle and the signal processing unit 3 is fixed at a prejudged position in or around the interior of the vehicle thereby to detect target ahead of the vehicle.

The transmitter 4 comprises a voltage controlled oscillator (VCO) 42; a modulator (MOD) 41 for converting the modulation (envelope) signal Sm into a level range adapted to the VCO 42; a power divider 43 dividing the output signal of the VCO 42 into a transmission signal St and a local signal SL for use in the receiver 5 (detailed later), and a transmission antenna 44 for radiating a radar wave in response to the transmission signal from the power divider 43.

The receiver 5 comprises a receiving antenna 51 for receiving an echo or returned radar wave; a mixer (MIX) 52 for mixing the received signal Sr from the receiving antenna 51 with the local signal SL passed from the power divider 43 to provide a beat signal; a preamplifier (AMP) 53 for amplifying the beat signal from the mixer 52; a low pass filter (LPF) 54 for removing higher frequency components from the amplified beat signal to output a beat component signal which is a differential component between the frequencies of the received signal Sr and the local signal SL; and an amplifier (AMP) 55 for amplifying the beat component signal to a desired level. The output signal of the amplifier 55 is referred to as "the beat component signal Sb".

The signal processing unit 3 comprises a modulation envelope signal generator (MES GEN.) 32 for generating a modulation envelope signal which is one cycle of triangular wave in response to a transmission control signal C1; an analog-to-digital converter (A/D) 34 for converting the beat component signal Sb into digital data Dd; a controller 36 for controlling the MES generator 32 and the converter 34 and executing a range and relative velocity detecting operation for each of the targets on the basis of the digital data Dd obtained for the A/D converter 34; and an arithmetic processor 38 for executing a fast Fourier transform (FFT) operation in response to a command from the controller 36.

As is well known in the art, the controller 36 comprises a central processing unit (CPU) 62, a read only memory (ROM) 64 for storing one or more programs required for the operation of the FMCW radar system 1 and a random access memory (RAM) 66.

It should be noted that a part or the entirety of the signal processing unit 3 may be embodied by using any suitable tailored or ready-made computer. In this case, the programs stored in ROM 64 may be stored in mass storage media such as a floppy disc (FD), a CD-ROM (compact disc read only memory), a magnetooptic disc (MO), a digital versatile disc (DVD), a hard disc, a memory card, etc. and loaded into RAM 66 when used. Alternatively, the programs may be down loaded into RAM 66 from any other system via network.

Referring to FIGS. 1 through 6, we discuss the operation of the FMCW radar system 1 in the following.

Figure 2:
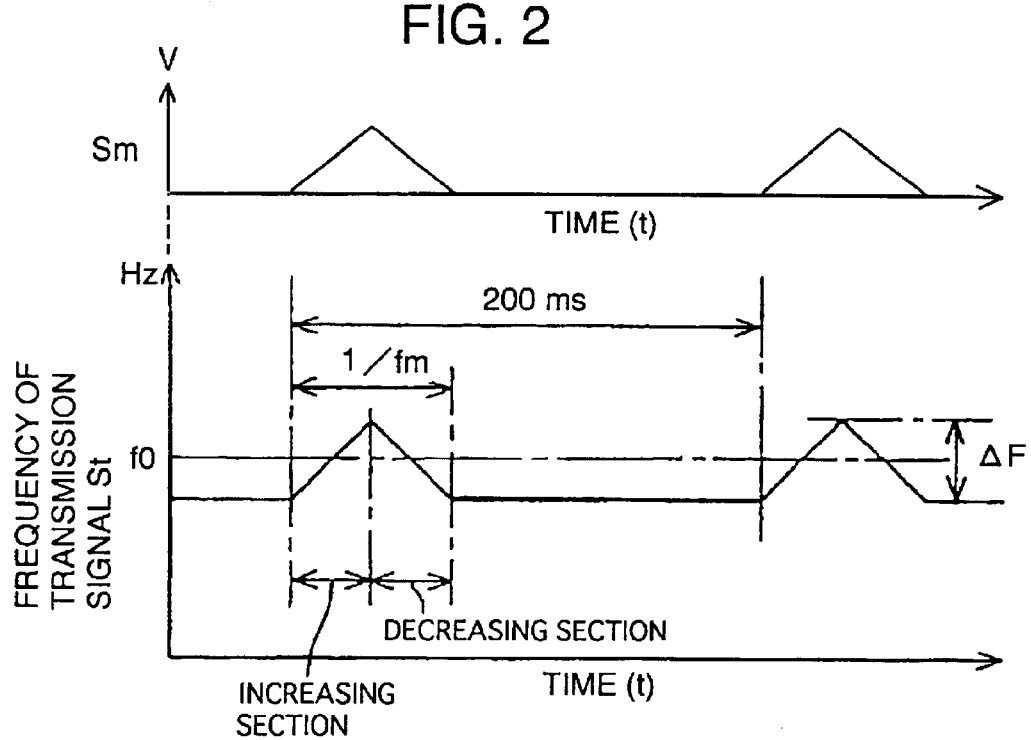
FIG. 2 is a diagram showing the relationship between the modulation envelope signal Sm and the transmission signal St.

FIG. 2 is a diagram showing the relationship between the modulation envelope signal Sm generated by the generator 32 and the transmission signal St generated by the VCO 42.

The modulation envelope signal (MES) generator 32 generates the modulation envelope signal Sm as shown in the upper portion of FIG. 2. Specifically, in response to an assertion of the transmission control signal C1, the MES generator 32 outputs a triangular pulse of which the maximum width is 1/fm (which is a modulation period). The modulation envelope signal is level adjusted by the modulator 41. The level-adjusted modulation envelope signal is applied to the VCO 42, which in turn generates the transmission signal St the frequency of which varies as shown in the lower portion of FIG. 2. The frequency of the transmission signal St increases by ΔF with ascending of the modulation envelope signal (this period of time is referred to as "the increasing section" of a modulation period) and decreases by ΔF with descending of the modulation envelope signal (this period of time is referred to as "the decreasing section" of a modulation period). The middle frequency of the variation range of the frequency of the transmission signal is f0 (Hz). In order to execute a target detection operation every 200 ms, the triangular pulses or the modulation periods are 200 ms apart from each other.

The transmission signal St is applied to the antenna 44 via the power divider 43 and transmitted from the antenna 44. The FMCW radar system 1 judges the direction of a target by horizontally rotating the transmission antenna 44 and the receiving antenna 51. However, the direction determination method is not limited to this antenna rotating method. The invention may be applied to a phase difference mono-pulse radar which identifies the target direction on the basis of the phase difference(s) between signals from a plurality of antennas.

The radar wave is radiated from the transmission antenna 44 in response to the transmission signal St, reflected by a target and received by the antenna 51 to yield the received signal Sr. The received signal Sr is mixed by the mixer 52 with the local signal SL passed from the power divider 43 to become the beat signal. As described above, the beat signal is processed by the preamplifier 53, the LPF 54 and the amplifier 55, which yields low frequency components of the beat signal, which are referred to en bloc as "the beat component signal Sb".

It is noted that the received signal Sr has been delayed by a time it takes for the radar wave to go to and from a target and has been subjected to a Doppler shift in response to the relative velocity with respective to the target if the relative velocity is not zero. Thus, the beat component signal Sb includes a delay component and a Doppler shift component.

If the A/D converter 34 is activated by a control signal C2 from the controller 36, the A/D converter 34 converts the beat component signal Sb into digital data Dd, writes the data Dd in a prejudged area of RAM 66 at a prejudged interval, and sets an end flag (not shown) at a prejudged location in RAM 66 in response to a completion of a prejudged number of A/D conversion operations to become inactive.

Figure 3:
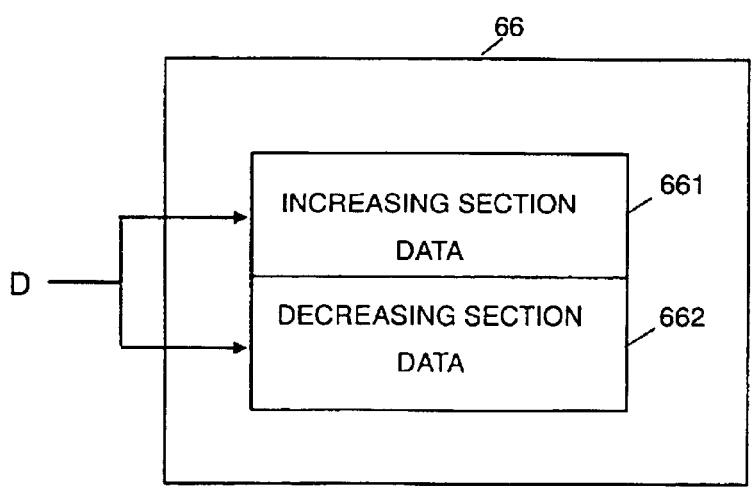
FIG. 3 is a diagram showing how the detected data is stored in RAM 36.

At the same time as that of activation of the modulation envelope signal generator 32, the A/D converter 34 is activated by the control signal C2 from the controller 36. Then, in each of the increasing and decreasing sections of the modulation period (1/fm), the A/D converter 34 converts the beat component signal Sb into digital data D a prejudged number (N) of times and stores in respective areas in RAM 66 as shown in FIG. 3. Specifically, the converter 34 stores N pieces of data 661 (referred to as "increasing section data") in RAM 66 during the increasing section of the modulation period and stores N pieces of data 662 (referred to as "increasing section data") in RAM 66 during the decreasing section of the modulation period. Completing the A/D conversion operations, the A/D converter 34 sets an end flag (not shown) at a prejudged location in RAM 66 and becomes inactive.

The controller 36 uses the data stored in RAM 66 to detect the targets (or obtain the target information for each target) in the monitoring field of the FMCW radar system 1 in each scan cycle. As seen from FIG. 2, the target detection operation is repeated every 200 ms.

Figure 4:
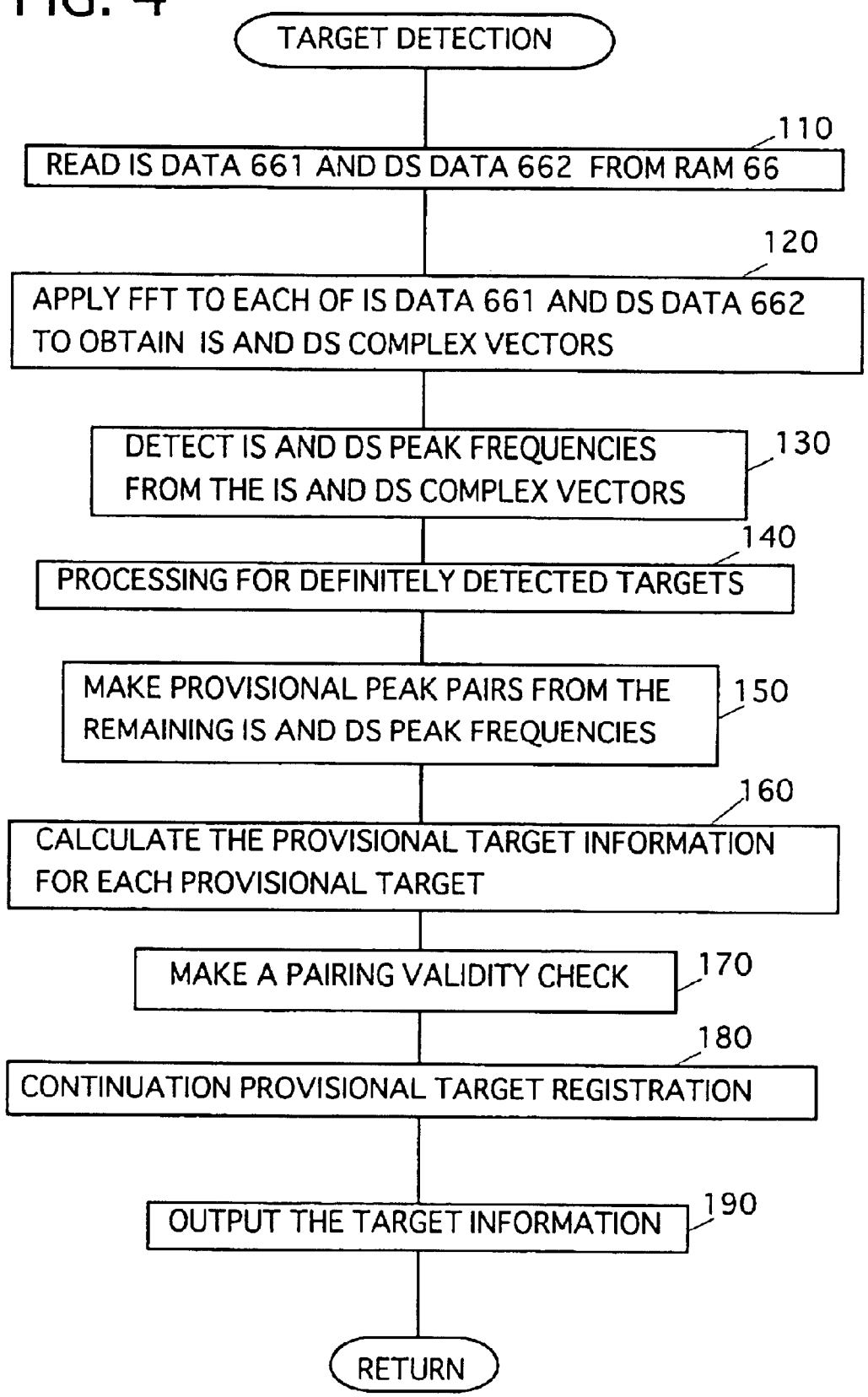
FIG. 4 is a flowchart showing an exemplary target detection operation in accordance with an illustrative embodiment of the invention.

FIG. 4 is a flowchart showing an exemplary target detection operation executed by CPU 62 under a program stored in ROM 64 in accordance with the illustrative embodiment of the invention. In FIG. 4, CPU 62 reads the increasing section data 661 and the decreasing section data 662 from RAM 66 in step 110, and passes the data 661 and 662 to the arithmetic processor 38. The processor 38 responsively executes a fast Fourier transform (FFT) of each of the increasing section (IS) data 661 and the decreasing section (DS) data 662. In order to suppress the side robes due to the FFT, the IS data 661 and the DS data 662 are subjected to a well-known window operation by using a Hanning window, a triangular window, etc. The arithmetic processor 38 returns complex vectors for the frequencies in the IS data 661 (referred to as "IS complex vectors") and complex vectors for the frequencies in the DS data 662 (referred to as "DS complex vectors") to the controller 36.

In step 130, on the basis of the absolute values of the IS complex vectors, i.e., the amplitudes of the frequencies indicated by the IS complex vectors, CPU 62 detects signal components constituting the peaks in the IS frequency spectrum and identifies the frequencies of the detected signal components as the IS peak frequencies. Similarly, on the basis of the absolute values of the DS complex vectors, CPU 62 detects signal components constituting the peaks in the DS frequency spectrum and identifies the frequencies of the detected signal components as the DS peak frequencies. In other words, CPU 62 detects, in frequencies of the IS and DS beat component signals, all of the IS peak frequencies and the DS peak frequencies that are thought to be derived from the returned signals from the targets in the monitoring field, respectively.

In step 140, CPU 62 executes a detected target processing for each of L definitely detected targets that have been definitely detected (L is the number of definitely detected targets).

Figure 5:
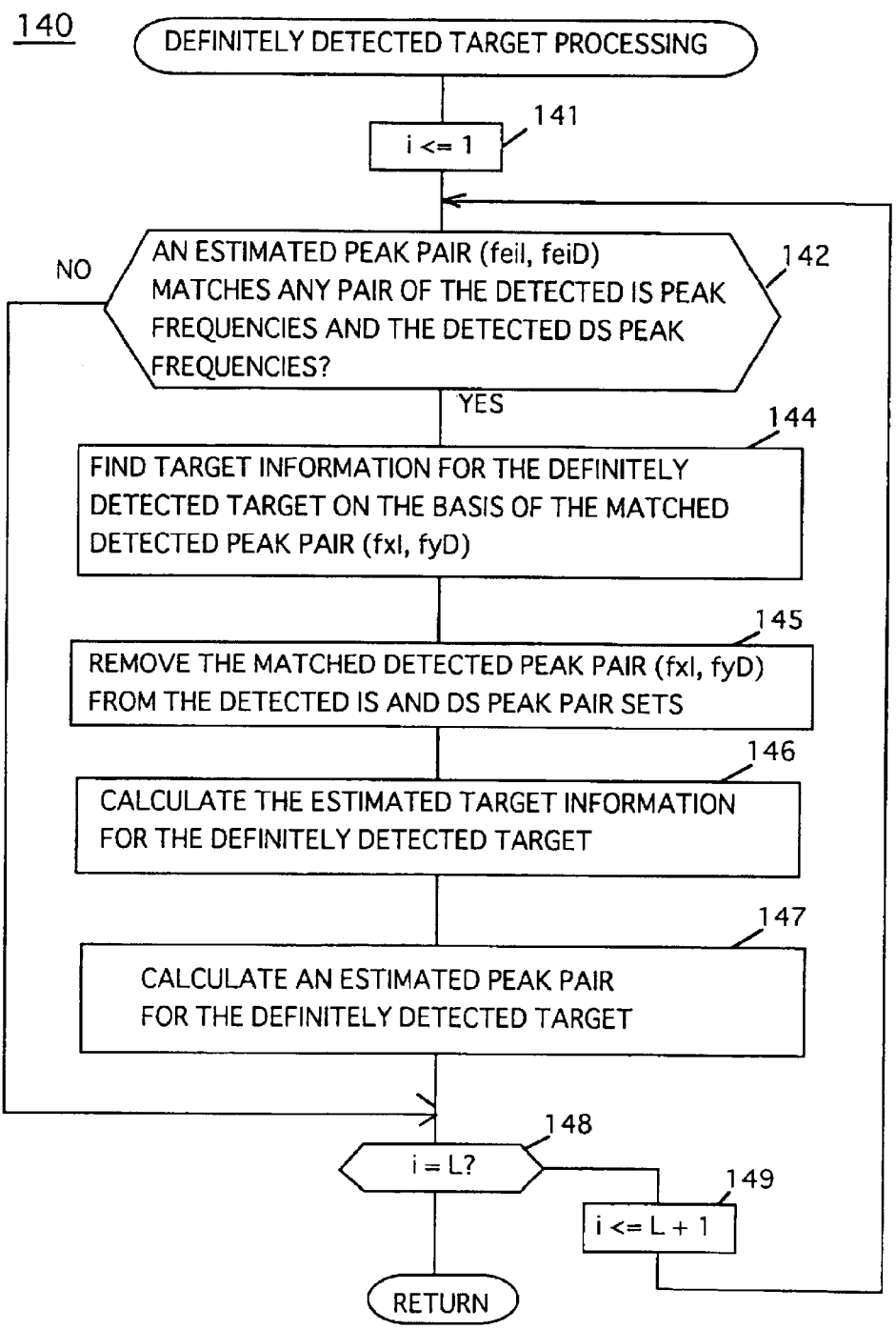
FIG. 5 is a flowchart showing a detailed operation of the detected target processing step 140 of FIG. 4

FIG. 5 is a flowchart showing a detailed operation of the detected target processing step 140. In FIG. 5, CPU 62 first sets a parameter i to 1 in step 141, and makes a test in step 142 to see if one of the estimated peak pairs {(feiI, feiD)|i=1, 2, . . . , L} that have been detected for the definitely detected targets in the previous target detection cycle or operation substantially matches any pair or combination of the detected IS peak frequencies f1I, f2I, . . . , fMI, and the detected DS peak frequencies f1D, f2D, . . . , fMD. If any matched pair of an IS peak frequency (denoted by fxI, where x is any of 1, 2, . . . , and M) and a DS peak frequency (denoted by fyD, where y is any of 1, 2, . . . , and M) exist, CPU 62 judges the matched detected peak pair (fxI, fyD) to be for the definitely detected target associated with the one estimated peak pair and finds the distance D and the relative velocity V for the definitely detected target on the basis of the matched detected peak pair (fxI, fyD) by using the above-described equations (1) and (2) in step 144. In this case, the frequencies fxI and fyD are substituted for frequencies fpI and fpD, respectively, in equations (1) and (2).

Optionally, CPU 62 may remove the matched detected peak frequencies fxI and fyD from the detected IS peak frequency set and the detected DS peak frequency set, respectively, in step 145.

Then, CPU 62 calculates the estimated distance which is expected to be found for the definitely detected target in the next target detection cycle in step 146. CPU 62 further calculates an estimated peak pair which is expected to be detected for the definitely detected target in the next target cycle in step 147. CPU 62 makes a test to see if all of the estimated peak pairs (fe1I, fe1D), (fe2I, fe2D), . . . , (feLI, feLD) have been exhausted, i.e., if the parameter i has reached L in step 148. If so, CPU 62 returns to the subroutine of FIG. 4. Otherwise, CPU 62 proceeds to step 149, where CPU 62 increments the parameter i and goes back to step 142.

Returning to FIG. 4, CPU 62 makes provisional peak pairs by pairing every one of the remaining IS peak frequencies and every one of the remaining DS peak frequencies in step 150. If there are 3 peak frequencies for example in each of the increasing section and the decreasing section in a modulation period, then CPU 62 makes 9 provisional peak pairs.

Alternatively, the provisional peak pairs may be reduced in number by considering historical data, behavioral tendency of each target, etc. and deleting a peak frequency if it is clear that the peak frequency is due to an echo from an object that has no need of detection: e.g., objects on the roadside.

I n step 160, assuming that the provisional targets associated with the provisional peak pairs actually exist, CPU 62 calculates the target information for each provisional target on the basis of the provisional peak pair associated with the provisional target. The target information in this case is referred to as "provisional target information". If the calculation based on a provisional peak pair has yielded an impossible value, then the provisional peak pair may be deleted or discarded.

In step 170, CPU 62 makes a pairing validity check in which it is judged whether the peak frequencies of each provisional peak pair are for an identical target.

Figure 6:
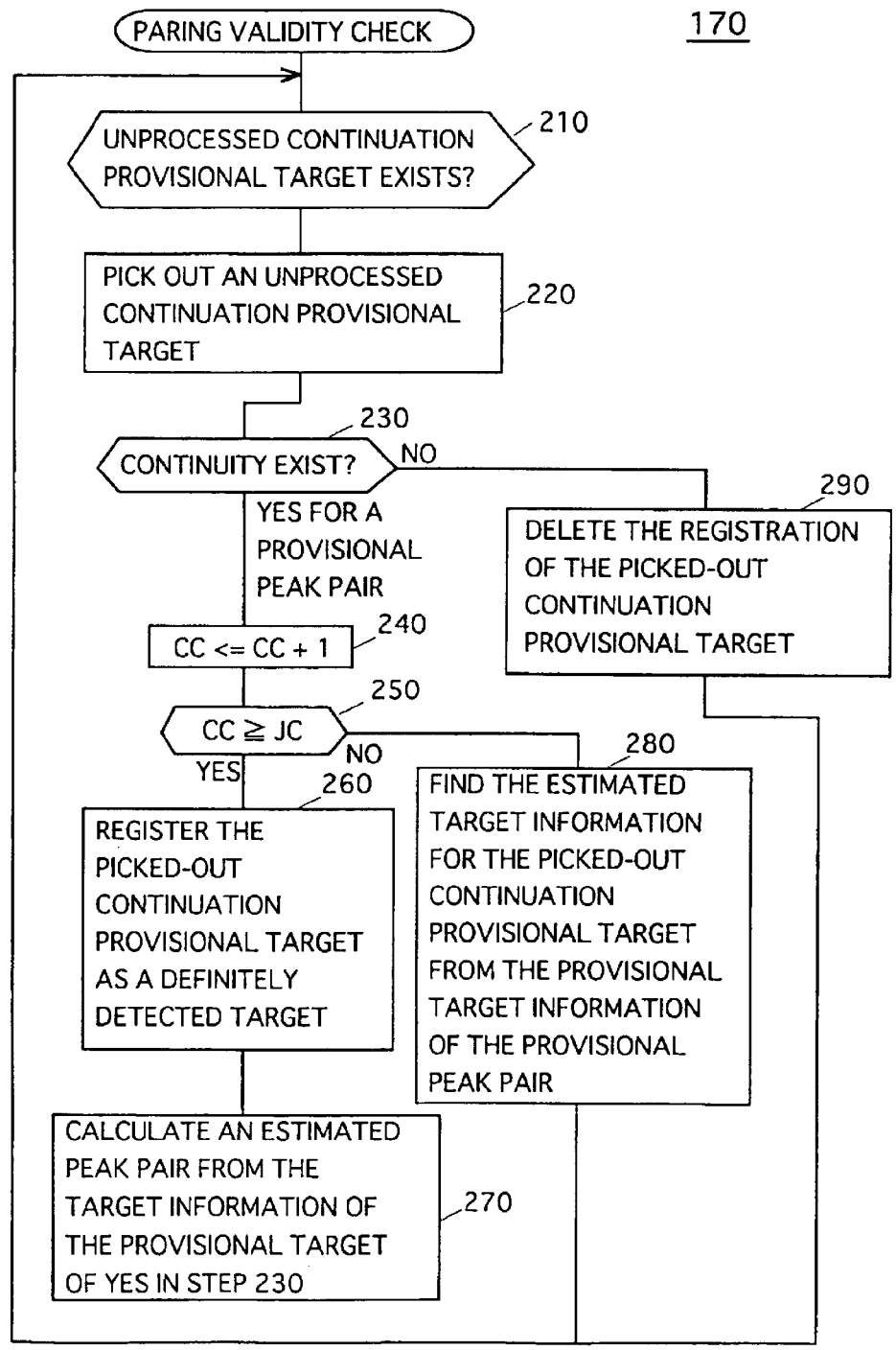
FIG. 6 is a flowchart showing a detailed operation of a pairing validity checking step 170 of FIG. 4.

FIG. 6 is a flowchart showing a detailed operation of a pairing validity checking step 170 of FIG. 4. In FIG. 6, CPU 62 makes a test, in step 210, to see if there is any unprocessed continuation provisional target that has to be processed by the following steps 220 through 290 in this target detection cycle. If not, then CPU 62 simply returns to the operation of FIG. 4. If there is (are) one or more unprocessed continuation provisional target(s) in step 210, then CPU 62 picks out one unprocessed continuation provisional target in step 220, and makes a continuity check, in step 230, to see if there is continuity between the picked-out continuation provisional target and each of provisional peak pairs made in step 150. Specifically, the continuity check is made to see if the difference between the estimated target information (i,e,. the distance and the relative velocity) that has been estimated for the picked-out continuation provisional target in the last target detection cycle and the provisional target information that has been calculated for each of provisional peak pairs in step 160 is within a preset allowable range (for each of the distance and the relative velocity). In this case, since the distance and the relative velocity constituting the provisional target information are a few times the distance resolution and the velocity resolution that are dependent on the characteristics of the radar wave and data processing ways such as the bit width, the allowable ranges are preferably preset larger than the distance resolution and the velocity resolution. This can eliminate the possibility of deleting the registration of the picked-out continuation provisional target (in step 290 described later) because of lacking in continuity even if the relative velocity of a provisional target is so low that the provisional target cannot move more than the distance resolution in one cycle period.

If the test result is NO for every provisional peak pair in step 230, then CPU 62 deletes the registration of the picked-out continuation provisional target in step 290 and proceeds to step 210 to repeat the paring validity check.

If the test result for any provisional peak pair is YES in step 230, then CPU 62 increments the continuation cycle count CC set for the picked-out continuation provisional target in step 240. Then, in step 250, CPU 62 makes a test to see if the continuation cycle count CC is equal to or larger than a validity criterion cycle count JC set for the picked-out continuation provisional target.

If so, CPU 62 proceeds to step 260 to register the picked-out continuation provisional target as a definitely detected target and delete the registration as a continuation provisional target. Then, in step 270, CPU 62 calculates an estimated peak pair (i.e., estimated IS and ID peak frequencies) which is expected to be detected in the next target detection cycle on the basis of the target information of the provisional target for which the test result has been judged to be YES in step 230, and proceeds to step 210.

If the test result is NO in step 250, then CPU 62 proceeds to step 280, where in order to continue the registration of the picked-out continuation provisional target as continuation provisional target, CPU 62 estimates the distance and the relative velocity that are expected for the picked-out continuation provisional target in the next target detection cycle on the basis of the provisional target information of the provisional peak pair for which the test result has been judged to be YES in step 230. Then, CPU 62 proceeds to step 210.

To sum up, in the paring validity check 170, a continuation provisional target is judged to be a definitely detected target if the continuation provisional target has been continuously judged to have the continuity or consistency with a provisional target for target detection cycles of the validity criterion cycle count JC. On the contrary, if it is judged that a continuation provisional target lacks in continuity with a provisional target before the validity criterion cycle count JC is reached, the provisional peak pair that has been made for the continuation provisional target in the last target detection cycle is judged to be wrong and is accordingly deleted.

Returning now to FIG. 4, in step 180, CPU 62 executes a continuation provisional target registration operation to register a provisional target which has been judged to be in lack in continuity with a continuation provisional target in the previous step 170 as a new continuation provisional target.

Figure 7:
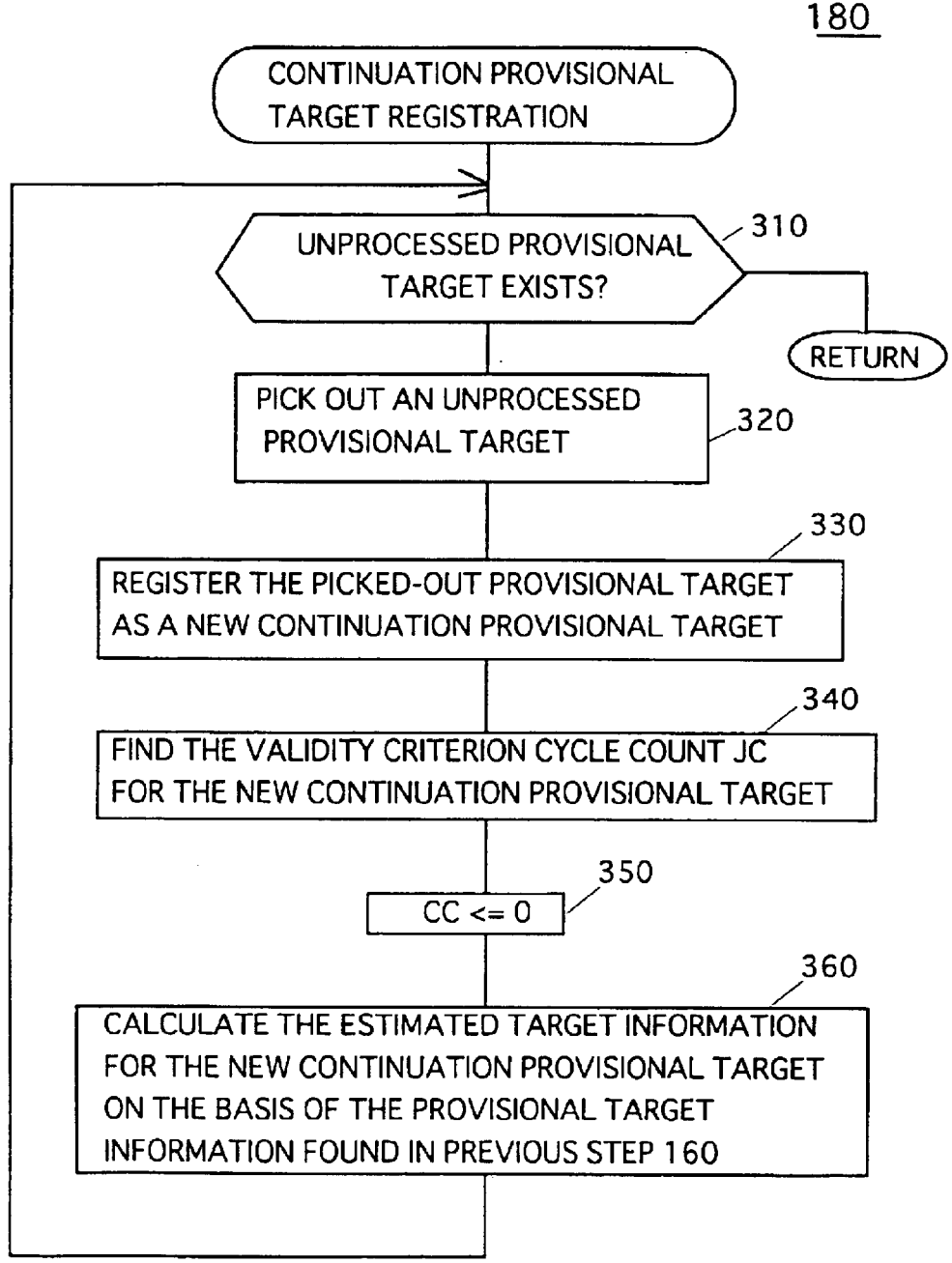
FIG. 7 is a flowchart showing a detailed operation of a provisional pair continuation registration step 180 of FIG. 4.

FIG. 7 is a flowchart showing a detailed operation of a continuation provisional pair registration step 180. In FIG. 7, CPU 62 makes a test, in step 310, to see if, in the provisional targets which have been judged to be in lack in continuity with a continuation provisional target, there is any unprocessed provisional target that has to be processed by the following steps 320 through 360.

If not, then CPU 62 simply returns to the operation of FIG. 4.

If there is (are) one or more unprocessed provisional target(s) in step 310, then CPU 62 picks out one unprocessed provisional target in step 320. Then, CPU 62 registers the picked-out provisional target as a new continuation provisional target in step 330.

In step 340, CPU 62 finds the validity criterion cycle count JC for the new continuation provisional target by using the following equations.

$$Tg = K \cdot Dr/V + Tc \quad (3)$$

$$JC = [Tg/\Delta t] \quad (4)$$

Here, Tg is a validity checking time, K is a coefficient not smaller than 1, Dr is the distance resolution, V is a relative velocity that has been calculated for the new continuation provisional target in step 160, Tc is an appropriate margin time, and Δt is a period of one target detection cycle. In this specific example, it is assumed that K=1, and Tc=0. Also, [x] means counting fractions after decimal point as a while number. Assuming n is a non-negative integer, if n·Δt<Tg<(n+1)·Δt, then JC=n+1.

In order to prevent the validity checking time Tg from becoming smaller than Dr/V, it is preferable that the coefficient K and the margin time Tc is set such that K≧1 and Tc≧0.

However, an upper limit is preferably set for the validity criterion cycle count JC. This can prevent the validity criterion cycle count JC from becoming too large when the relative velocity V of the new continuation provisional target is zero or nearly zero (as is the case with the relative velocity of the vehicle ahead in tracking cruise or that of side road objects during stopping of the vehicle).

In step 350, CPU 62 clears the continuation cycle count CC of the new continuation provisional target with zero. In step 360, CPU 62 calculates the estimated target information for the new continuation provisional target on the basis of the provisional target information found in previous step 160.

To sum up, in the continuation provisional target registration step 180, CPU 62 registers, as new continuation provisional target, all of the provisional target which have been judged to be in lack in continuity with a registered continuation provisional target; and performs a continuation cycle count CC initialization and calculations of the validity criterion cycle count JC and the estimated target information.

Returning again to FIG. 4, CPU 62 outputs the target information calculated in step 140 and the target information for the target that has been registered as a definitely detected target in step 260 (i.e., the provisional target information calculated in step 160) in step 190, and completes the target detection operation.

Thus obtained target information can be used in determining whether a vehicle provided with the FMCW radar system 1 is in danger. For example, if it is judged from the target information that a danger is close at hand, it is possible to inform the driver of the danger by activating a not-shown warning device. Also, the target information enables tracking cruise keeping a constant distance to the vehicle ahead.

Figure 8:
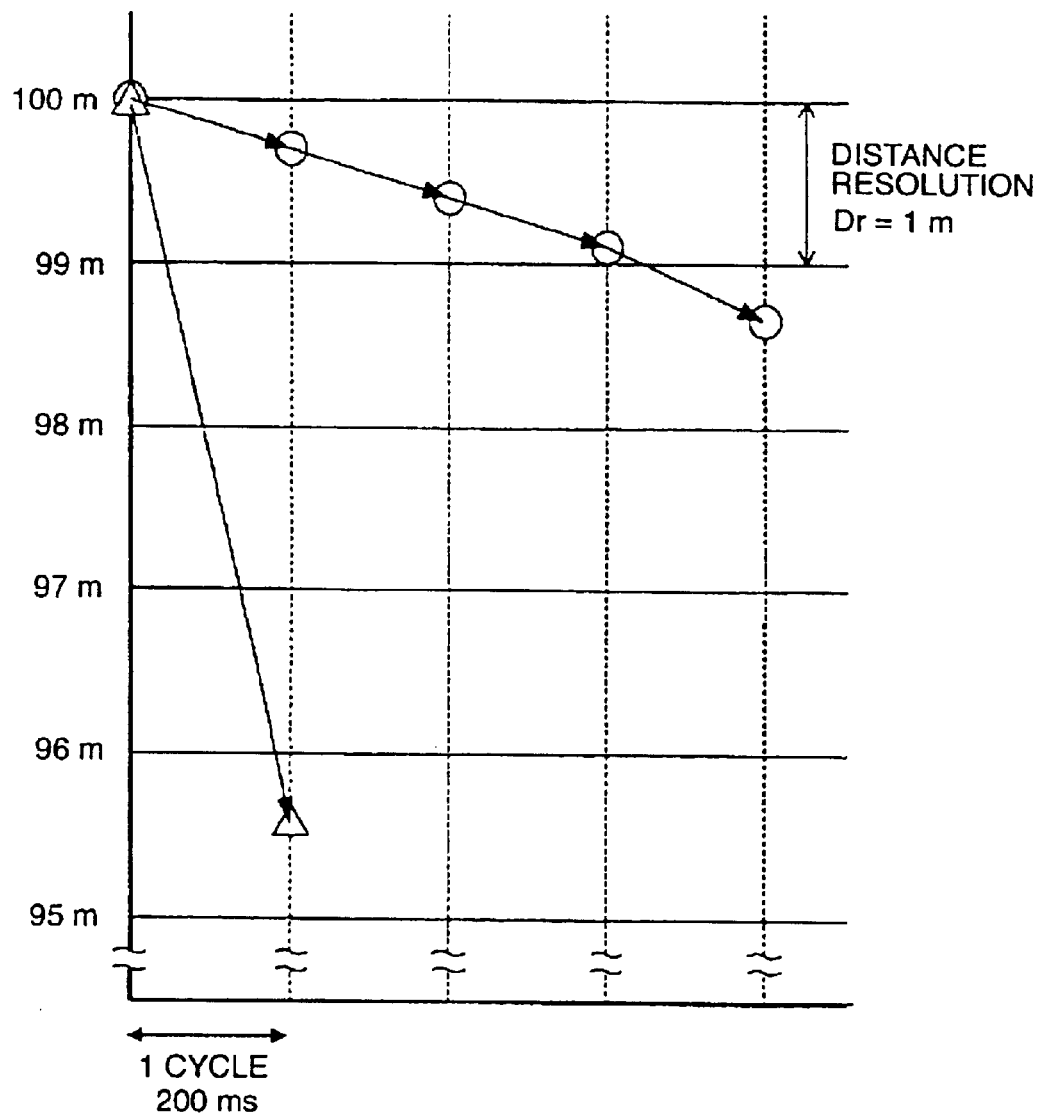
FIG. 8 is a diagram for illustrating the operation and advantages of the FMCW radar system 1.

FIG. 8 is a diagram for illustrating the operation and advantages of the FMCW radar system 1. In FIG. 8, it is assumed that the target detection cycle Δt is 200 ms, the distance resolution Dr is 1 m. Also assume that the FMCW radar system 1 has detected, 100 m ahead of own vehicle, a provisional target A running at a lower relative velocity (V) of −5 Km/h and a provisional target B running at a higher relative velocity (V) of −80 Km/h.

Then, in case of the provisional target A, since the validity checking time Tg is 720 ms from equation (3), the validity criterion cycle count JC is set to 4 according to equation (4). Also, since it is expected that the provisional target A will have made a distance of about 0.28 m by the next target detection cycle and that the relative velocity will hardly change, the estimated target information will be such that D=100.28 m and V=−5 Km/h.

On the other hand, in case of the provisional target B, since the validity checking time Tg is 45 ms from equation (3), the validity criterion cycle count JC is set to 1 according to equation (4). Also, since it is expected that the provisional target B will have made a distance of about 4.44 m by the next target detection cycle and that the relative velocity will hardly change, the estimated target information will be such that D=104.44 m and V=−80 Km/h.

As described above, the decision on the continuity of a provisional target is made by making a test to see if there will be a target of which the target information matches the estimated target information for the target in question with an error less than the preset allowable value. However, in case of a provisional target of a lower relative velocity such as A, the moved distance after 200 ms (=one target detection cycle) is equal to the above estimated distance (0.28 m), which is under the distance resolution Dr (=1 m in this specific example). This disables the decision on whether the provisional target exists at the expected distance. However, after cycle periods of the validity criterion cycle count JC (=4 in this specific example) has lapsed, i.e., after 800 ms (=200 ms×4) has lapsed, the moved distance is four times the expected distance, i.e., about 1.12 m, which exceeds the distance resolution Dr. This enables the decision on whether the provisional target exists at the expected distance.

On the other hand, in case of a provisional target of a higher relative velocity such as B, the moved distance after 200 ms (=one target detection cycle) is equal to the above estimated distance (4.44 m), which exceeds the distance resolution Dr. This immediately enables the decision on whether the provisional target exists at the expected distance.

As described above, to output the target information in response to a determination as a definitely detected target after a detection of a new provisional target, it takes four cycles' worth of time (or 800 ms) in case of provisional target A and one cycle's worth of time (or 200 ms) in case of provisional target B. That is, in case of a provisional target of a higher relative velocity, the FMCW radar system 1 is capable of quick detection (by reducing three cycles' worth of time (or 600 ms)) without lowering the detection accuracy.

Figure 9A:
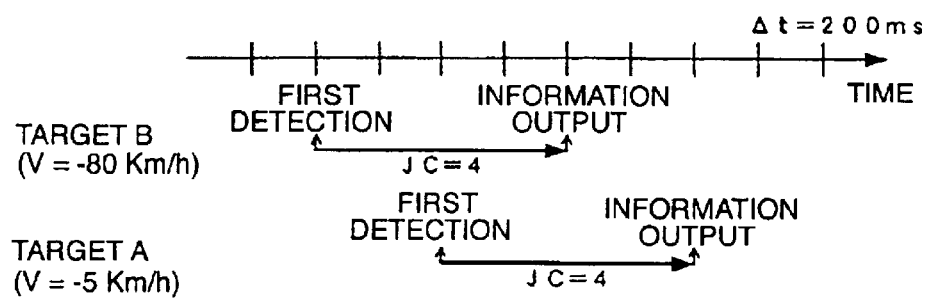
FIG. 9 is a diagram for illustrating the advantages of the FMCW radar system 2.
Figure 9B:
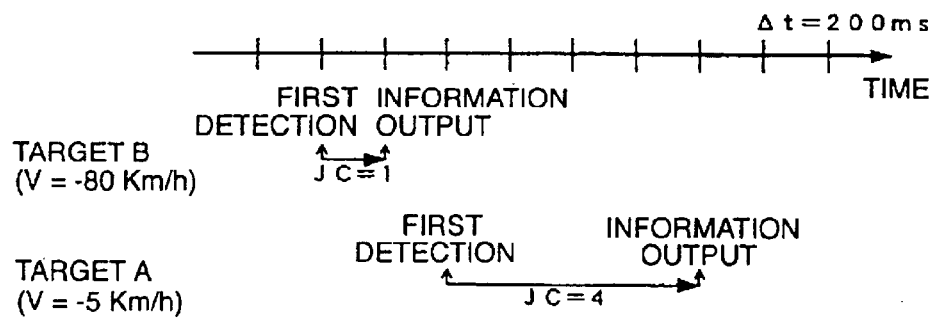

In conventional FMCW radar system, the number of cycles used for a paring validity check is constant; and accordingly the target information is never output without the lapse of a certain period of time regardless of the relative velocity, i.e., the degree of danger as shown in FIG. 9A. On the other hand, according to the present invention, the number of cycles used for a paring validity check (i.e., the validity criterion cycle count JC) is set in response to the relative velocity; which enables the target information for a target of higher relative velocity to be output the more quickly as shown in FIG. 9B.

As described above, according to the invention, the validity criterion cycle count JC (or the validity checking time Tg) that it takes to ascertain that a provisional target is an actual target is set to a smaller value for a higher relative velocity and to a larger value for a lower relative velocity. This enables both of a quick detection of higher relative speed provisional target such as a rapidly approaching dangerous provisional target and a sure detection of smaller relative speed provisional target such as slowly approaching less dangerous provisional target. Further, it should he noted that since a target of higher relative speed can move for the distance resolution's worth of distance in a shorter time, the accuracy of target detection never largely lowers as compared with conventional FMCW radar systems even if the validity checking time is set to a smaller value in case of the relative velocity being higher.

In the above-described illustrative embodiment, if it is judged that a continuation provisional target lacks in continuity even once before the continuation cycle count CC reaches the validity criterion cycle count JC, the registration of the continuation provisional target has been deleted. A FMCW radar system may be so configured as to continue the registration through any operation such as interpolation depending on the reliability (e.g., the reception intensity, the number of peaks, etc.) of the provisional target even if the continuity is not complete.

In the above embodiment, the estimated target information has been used in judging the continuity of a continuation provisional target with a provisional target. However, the judgment may be achieved by finding an estimated peak pair and directly comparing this with peak frequencies as in case of extracting a peak pair for a definitely detected target.

Also, a FMCW radar system may be so configured as to be raised in response by determining whether a provisional target is in the running direction of own vehicle by detecting the azimuth angle of the provisional target and making the validity criterion cycle count JC small by reducing the values of the coefficient K and the margin time Tc if the provisional target is in the running direction.

If there is only one continuation provisional target to be processed in the paring validity check or if there is only one provisional target to be processed in the continuation provisional target registration, then such only one provisional target may be registered as a definitely detected target.

Many widely different embodiments of the present invention may be constructed without departing from the scope of the present invention. It should be understood that the present invention is not limited to the specific embodiments described in the specification, except as defined in the appended claims.

What is claimed is:

1. A frequency modulated continuous wave (FMCW) radar system for detecting a distance and a relative velocity of a target, the radar system comprising:

a transmitter having:

means for generating, every detection cycle, a transmission signal, a frequency of which increases during an increasing section and decreases during a decreasing section;

a receiver having:

means for extracting a beat component signal from said transmission signal and a received return signal reflected by said target; and processing means having:

(a) means for extracting peak frequencies of said increasing and decreasing sections at which said beat component signal becomes amplitude peaks from said beat component signal;

(b) means for finding target information of each of definitely detected targets from a peak pair which denotes a pair of peak frequencies of said increasing and decreasing sections selected for said definitely detected target from said extracted peak frequencies said target information including a distance and a relative velocity;

(c) means for making provisional peak pairs from extracted peak frequencies other than those used for peak pairs associated with said definitely detected targets, and assuming that said provisional peak pairs correspond to respective provisional targets;

(d) means, activated every detection cycle, for making a test to see if each of continuation provisional targets which have been detected at least one detection cycle ago has continuity with any of said provisional peak pairs;

(e) means for registering said continuation provisional target that has passed said test made in a preset number of detection cycles as a new definitely detected target;

(f) means for registering said provisional target that has failed in continuity with any of said continuation provisional targets as a new continuation provisional target; and (g) means for setting said preset number of detection cycles associated with said new continuation provisional target to a value, said value being such that the higher the relative velocity of said new continuation provisional target, the smaller said value and vice versa.

2. A FMCW radar system as defined claim 1, wherein said means recited in (g) for setting said preset number of detection cycles includes means for calculating said value according to a linear expression including:

Dr/V, where Dr is a distance resolution of the FMCW radar system and V is a relative velocity calculated from the peak pair for said new continuation provisional target.

3. A FMCW radar system as defined claim 2, wherein the FMCW radar system is installed in a motor vehicle, and wherein said means recited in (g) for setting said preset number of detection cycles includes means for setting said preset number to a smaller value smaller than said value if said new continuation provisional target exists in the running direction of said motor vehicle or in a same lane as that of said motor vehicle.

4. A FMCW radar system as defined claim 1, wherein said means recited in (e) for registering said continuation provisional target includes means, in response to a judgment that there is only one continuation provisional target that has failed in continuity with any of said provisional peak pairs and that has not cleared said preset number of said tests, for immediately registering said only one continuation provisional target as a new definitely detected target.

5. A FMCW radar system as defined claim 1, further including means, in response to a judgment that there is only one continuation provisional target, for unconditionally registering said only one continuation provisional target as a new definitely detected target.

6. A FMCW radar system as defined claim 1, further including:

means for finding provisional target information including a distance and a velocity of each of said provisional targets from one of said provisional peak pairs associated with the provisional target; and means, operative on the basis of said provisional target information, for finding estimated target information including an estimated distance and an estimated velocity which are expected to be detected for each of said continuation provisional targets in the next detection cycle, wherein said means recited in (d) for making a test comprises:

means for making a test to see if said estimated target information of each of said continuation provisional targets matches said provisional target information of any of said provisional targets, wherein an error value associated with said test is under a predetermined allowable value.

7. A FMCW radar system as defined claim 6, wherein said predetermined allowable value is larger than a calculation resolution of said provisional target information.

8. A FMCW radar system as defined claim 1, further including:
   means for finding provisional target information including a distance and a velocity of each of said provisional targets from one of said provisional peak pairs associated with the provisional target; and
   means, operative on the basis of said provisional target information, for finding an estimated peak pair which is expected to be detected for each of said continuation provisional targets in the next detection cycle, wherein said means (d) comprises:
   means for making a test to see if said estimated peak pair of each of said continuation provisional targets matches said provisional peak pair of any of said provisional targets, wherein an error value associated with said test is under a predetermined allowable value.

9. A computer program to be executed in a FMCW radar system for detecting a distance and a relative velocity of a target, wherein the radar system includes a transmitter for transmitting a transmission signal the frequency of which increases during an increasing section and decreases during an decreasing section every detection cycle; a receiver including means for extracting a beat component signal from said transmission signal and a received return signal reflected by said target; and a processing portion including means for extracting peak frequencies of said increasing and decreasing sections at which said beat component signal becomes amplitude peaks from said beat component signal, the computer program causing said processing portion to carry out:
   (a) finding target information of each of definitely detected targets from a peak pair which denotes a pair of peak frequencies of said increasing and decreasing sections selected for said definitely detected target from said extracted peak frequencies;
   (b) making provisional peak pairs from extracted peak frequencies other than those used for peak pairs associated with said definitely detected targets, and assuming that said provisional peak pairs correspond to respective provisional targets;
   (c) every detection cycle, making a test to see if each of continuation provisional targets which have been detected at least one detection cycle ago has continuity with any of said provisional peak pairs;
   (d) registering said continuation provisional target that has passed said test made in a preset number of detection cycles as a new definitely detected target;
   (e) registering said provisional target that has failed in continuity with any of said continuation provisional targets as new continuation provisional target; and
   (f) setting said preset number of detection cycles associated with said new continuation provisional target to a value, said value being such that the higher the relative velocity of said new continuation provisional target, the smaller said value and vice versa.

10. A computer program as defined claim 9, wherein said step (f) includes the step of calculating said value according to a linear expression including:
   Dr/V,
   where Dr is a distance resolution of the FMCW radar system and V is a relative velocity calculated from a peak pair for said new continuation provisional target.

11. A frequency modulated continuous wave (FMCW) radar system for detecting a distance to a target and a relative velocity of the target, the radar system comprising:
   a transmitter transmitting a transmission signal every detection cycle, the transmission signal having an increasing frequency during an increasing section and a decreasing frequency during a decreasing section;
   a receiver extracting a beat component signal from the transmission signal and a return signal reflected by the target; and
   a processor configured to:
   extract peak frequencies from the increasing and decreasing sections at which the beat component signal has amplitude peaks;
   find target information associated with each of one or more definitely detected targets from a peak pair of the peak frequencies extracted from the increasing and decreasing sections, the peak pair selected for one of the one or more definitely detected targets, the target information including a distance and a relative velocity;
   make one or more provisional peak pairs from the extracted peak frequencies other than those used for the peak pair associated with the one of the one or more definitely detected targets, the provisional peak pairs corresponding to respective provisional targets;
   test for continuity at least once every detection cycle between each of one or more continuation provisional targets detected during at least one previous detection cycle and any of the provisional peak pairs corresponding to respective provisional targets;
   register one of the one or more continuation provisional targets passing the test made in a preset number of detection cycles as a new definitely detected target;
   register one of the respective provisional targets failing in continuity with any of the one or more continuation provisional targets as a new continuation provisional target; and
   set the preset number associated with the new continuation provisional target to a value, the value being such that the higher the relative velocity of the new continuation provisional target, the smaller the value and vice versa.

12. A FMCW radar system as defined claim 11, wherein the processor, in the setting the preset number of detection cycles, is further configured to calculate the value according to a linear expression including:
   Dr/V,
   where Dr is a distance resolution of the FMCW radar system and V is a relative velocity calculated from the peak pair associated with the new continuation provisional target.

13. A FMCW radar system as defined claim 12, wherein the FMCW radar system is installed in a motor vehicle, and wherein the processor, in the setting the preset number of detection cycles, is further configured to set the preset number to a smaller value smaller than the value if the new continuation provisional target is detected in one of a running direction of the motor vehicle and a same lane as that of the motor vehicle.

14. A FMCW radar system as defined claim 11, wherein the processor, in registering the one of the one or more continuation provisional targets, is further configured to immediately register the one of the one or more continuation provisional targets as a new definitely detected target in response to a determination that the one of the one or more continuation provisional targets is an only one of the one or more continuation provisional targets failing in continuity with any of the provisional peak pairs and not clearing the preset number of the tests.

15. A FMCW radar system as defined claim 11, wherein the processor is further configured to unconditionally register the one of the one or more continuation provisional target as a new definitely detected target in response to a determination that the one of the one or more continuation provisional target is an only one of the one or more continuation provisional targets.

16. A FMCW radar system as defined claim 11, wherein the processor is further configured to:
   find provisional target information including a distance and a velocity of each of the respective provisional targets from one of the provisional peak pairs associated with the respective provisional targets; and
   find estimated target information including an estimated distance and an estimated velocity expected to be detected for each of the one or more continuation provisional targets in the next detection cycle, the finding based on the provisional target information,
   wherein the processor in the testing for continuity, is further configured to test for a match between the estimated target information of the each of the one or more continuation provisional targets and the provisional target information of any of the respective provisional targets, and
   wherein a match is deemed to exist when an error value associated with the test is has not reached a predetermined allowable value.

17. A FMCW radar system as defined claim 16, wherein the predetermined allowable value is larger than a calculation resolution of the provisional target information.

18. A FMCW radar system as defined claim 11, wherein the processor is further configured to:
   find provisional target information including a distance and a velocity of each of the respective provisional targets from one of the provisional peak pairs associated with the each of the respective provisional targets; and
   find an estimated peak pair which is expected to be detected for each of the continuation provisional targets in a next detection cycle based on the provisional target information,
   wherein the processor in the testing for continuity, is further configured to:
   test for a match between the estimated peak pair of the each of the continuation provisional targets and the provisional peak pair of any of the provisional targets, wherein a match is deemed to exist when an error value associated with the test is has not reached a predetermined allowable value.

* * * * *